United States Patent [19]

Benoist

[11] Patent Number: 4,801,206

[45] Date of Patent: Jan. 31, 1989

[54] SIMPLIFIED RING LASER GYROSCOPE DITHER CONTROL AND METHOD

[75] Inventor: Rodney W. Benoist, Moorpark, Calif.

[73] Assignee: Litton Systems, Inc., Beverly Hills, Calif.

[21] Appl. No.: 870,722

[22] Filed: Jun. 4, 1986

[51] Int. Cl.$^4$ ............................................. G01C 19/64
[52] U.S. Cl. .................................................. 356/350
[58] Field of Search ......................................... 356/350

[56] References Cited

U.S. PATENT DOCUMENTS

| | | | |
|---|---|---|---|
| 3,395,270 | 7/1968 | Speller | 235/150.25 |
| 3,411,849 | 11/1968 | Aronowitz | 356/28 |
| 3,503,005 | 3/1970 | Mocker | |
| 3,512,890 | 5/1970 | McLaughlin | 356/350 |
| 3,627,422 | 12/1971 | Chodorow | 356/350 |
| 3,697,887 | 10/1972 | Lee et al. | |
| 3,743,969 | 7/1973 | Hutchings | 332/7.51 |
| 3,807,866 | 4/1974 | Zingery | 356/350 |
| 3,854,819 | 12/1974 | Andringa | 356/350 |
| 4,013,365 | 3/1977 | Vali et al. | 356/350 |
| 4,039,260 | 8/1977 | Redman | 356/106 |
| 4,248,534 | 2/1981 | Elbert | 356/350 |
| 4,267,478 | 5/1981 | Ljung et al. | 310/315 |
| 4,247,832 | 1/1981 | Sanders et al. | |
| 4,295,710 | 10/1981 | Heinz | 350/310 |
| 4,309,107 | 1/1982 | McNair et al. | 356/350 |
| 4,314,174 | 2/1982 | Wing et al. | 310/315 |
| 4,321,557 | 3/1982 | McNair | 372/33 |
| 4,349,183 | 9/1982 | Wirt et al. | 267/160 |
| 4,383,763 | 5/1983 | Hutchings et al. | 356/350 |
| 4,392,229 | 7/1983 | Hostetler | 372/94 |
| 4,422,762 | 12/1983 | Hutchings et al. | 356/350 |
| 4,436,423 | 3/1984 | Kumar et al. | 356/350 |
| 4,526,469 | 7/1985 | Egli et al. | 356/350 |
| 4,529,311 | 7/1985 | Morgan et al. | 356/350 |
| 4,530,097 | 7/1985 | Stokes et al. | 372/6 |
| 4,597,667 | 7/1986 | Curby et al. | 356/350 |

FOREIGN PATENT DOCUMENTS 2749157 11/1978 Fed. Rep. of Germany .
2271542 12/1973 France .

OTHER PUBLICATIONS

Coccoli, "An Overview Of Laser Gyros", 12th Joint Services Data Exchange for Inertial Systems, Norfolk, VA 1978.
Menegozzi et al., "Theory Of A Ring Laser", 1973, PHYSICAL REVIEW, vol. 8, No. 4, pp. 2103–2125.
Kilpatrick, "The Laser Gyro", Oct. 1967, IEEE SPECTRUM, pp. 44–55.

Primary Examiner—Vincent P. McGraw
Attorney, Agent, or Firm—John H. Lynn

[57] ABSTRACT

A dither flexure is mounted between a ring laser gyroscope body and a support such that the ring laser gyroscope may be dithered to have angular oscillations about a sensing axis. A sensor provides signals indicative of the amplitude of the oscillations of the ring laser gyroscope body relative to the support to a control circuit. The control circuit dithers the flexure to maintain the amplitude of the oscillations between a predetermined range at the resonant frequency of the flexure. The frequency of the dither oscillations is modulated about a tracking frequency, and the effect of frequency changes in the dither drive signal on the amplitude of the oscillations is demodulated to determine the resonant frequency of the dither flexure.

8 Claims, 6 Drawing Sheets

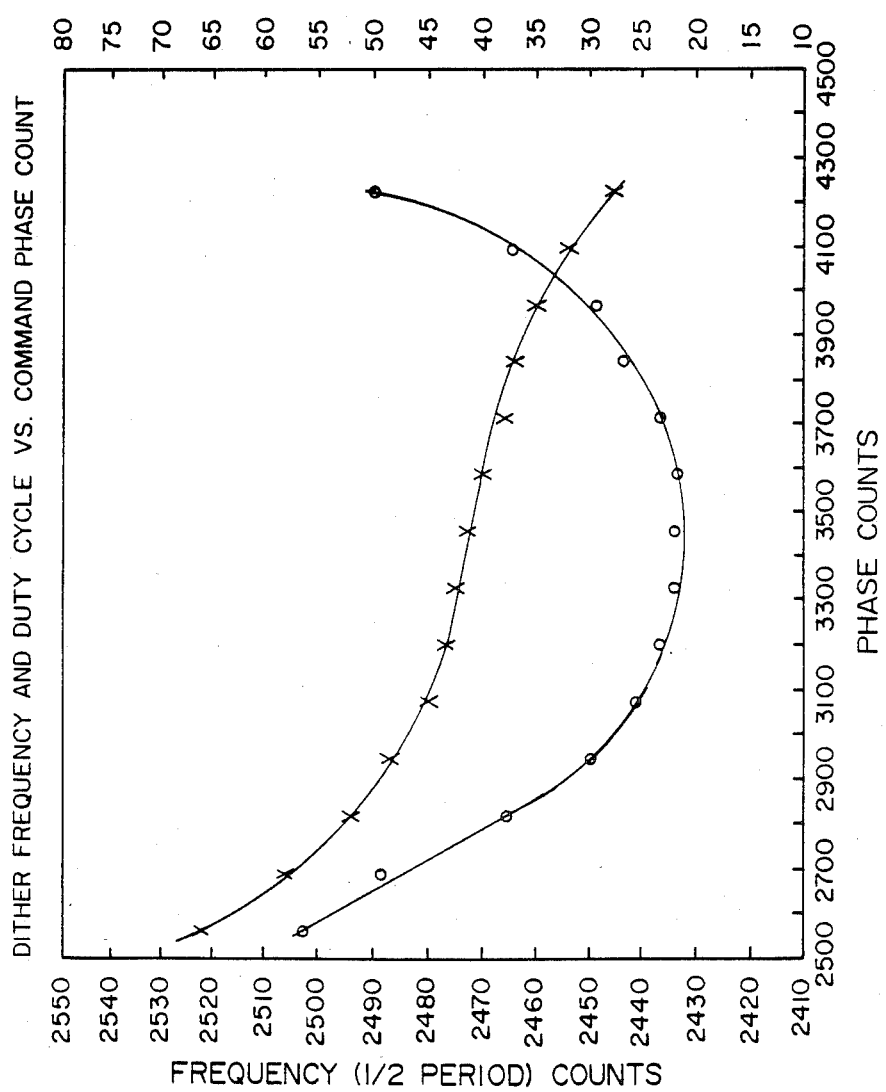

SIMPLIFIED RING LASER GYROSCOPE DITHER CONTROL AND METHOD

BACKGROUND OF THE INVENTION

This invention relates generally to rotation sensors and particularly to ring laser gyroscope rotation sensors. Still more particularly, this invention relates to apparatus and methods for controlling vibrations of a ring laser gyroscope frame to reduce the effects of lock-in.

A ring laser gyroscope employs the Sagnac effect to detect rotation. Two counter propagating light beams in a planar closed loop will have transit times that differ in direction proportion to the rotation rate of the loop about an axis perpendicular to the plane of the loop. The loop need not be planar, but the planar ring laser gyroscope has the simplest type of optical path.

There are in general two basic techniques for utilizing the Sagnac effect to detect rotations. A first technique is the interferometric approach, which involves measuring the differential phase shift between two counter-propagating beams injected from an external source, typically a laser, into a Sagnac ring. The ring may be defined by mirrors that direct the light beams around the path or by a coil of optical fibers. Beams exiting the path interfere and create a pattern of light and dark lines that is usually called a fringe pattern. Absolute changes in the fringe pattern are indicative of rotation of the ring. The primary difficulty with such devices is that the changes are very small for rotation rates of interest in guidance applications.

The ring laser gyroscope uses the resonant properties of a closed cavity to convert the Sagnac phase difference between the counter propagating beams into a frequency difference. The high optical frequencies of about $10^{15}$ Hz for light used in ring laser gyroscopes cause the minute phase changes to become beat frequencies that are readily measured.

A ring laser gyroscope has a sensor axis that passes through the closed paths traversed by the counter-propagating beams. When the ring laser gyroscope is not rotating about its sensor axis, the optical paths for the two counterpropagating beams have identical lengths so that the two beams have identical frequencies. Rotation of the ring laser gyroscope about its sensor axis causes the effective path length for light traveling in the direction of rotation to increase while the effective path length for the wave traveling opposite in direction to the rotation decreases.

Ring laser gyroscopes may be classified as passive or active, depending upon whether the lasing, or gain, medium is external or internal to the cavity. In the active ring laser gyroscope the cavity defined by the closed optical path becomes an oscillator, and output beams from the two directions beat together to give a beat frequency that is a measure of the rotation rate. The oscillator approach means that the frequency filtering properties of the cavity resonator are narrowed by many orders of magnitude below the passive cavity and give very precise rotation sensing potential. To date the major ring laser gyroscope rotation sensor effort has been put into the active ring laser. Presently all commercially available optical rotation sensors are active ring laser gyroscopes.

When the rotation rate of the ring laser gyroscope is within a certain range, the frequency difference between the beams disappears. This phenomenon is called frequency lock-in, or mode locking, and is a major difficulty with the ring laser gyroscope because at low rotation rates the ring laser gyroscope produces a false indication that the device is not rotating. If the rotation rate of a ring laser gyroscope starts at a value above that where lock-in occurs and is then decreased, the frequency difference between the beams disappears at a certain input rotation rate. This input rotation rate is called the lock-in threshold and may be denoted $\Omega_L$. The range of rotation rates over which lock-in occurs is the deadband of the ring laser gyroscope.

Lock-in is believed to arise from coupling of light between the beams. The coupling results primarily from backscatter off the mirrors that confine the beams to the closed path. Backscatter causes the beam in each direction to include a small component having the frequency of the beam propagating in the other direction. The lock-in effect in a ring laser gyroscope is similar to the coupling that has been long been observed and understood in conventional electronic oscillators.

In addition to causing erroneous rotation rate information to be output from a ring laser gyroscope, lock-in causes standing waves to appear on the mirror surfaces. These standing waves may create a grating of high and low absorption regions, which create localized losses that increase the coupling and the lock-in. The mirrors may be permanently distorted by leaving a ring laser gyroscope operating in a lock-in condition.

Any inability to accurately measure low rotation rates reduces the effectiveness of a ring laser gyroscope in navigational systems. There has been substantial amount of research and development work to reduce or eliminate the effects of lock-in to enhance the effective use or ring laser gyroscopes in such systems.

There are several known approaches to solving the problems of lock-in. One such approach involves mechanically oscillating the ring laser gyroscope about its sensor axis so that the device is constantly sweeping through the deadband and is never locked therein. This mechanical oscillation of the ring laser gyroscope is usually called dithering. A typical ring laser gyroscope may be dithered at about 400 Hz with an angular displacement of a few arc minutes.

Dithering is accomplished by mounting the ring laser gyroscope frame on a flexure device that includes a plurality of vanes or blades extending from a central portion. Each blade has a pair of piezoelectric elements mounted on opposite sides thereof. Voltages are applied to the piezoelectric elements such that one piezoelectric element on each blade increases in length while the other piezoelectric element decreases in length. The effect of these length changes in the piezoelectric elements is transmitted to the blades through the mounting of the piezoelectric elements thereon. Increasing the length of one side of each blade while shortening the other side causes the blades to flex or bend so that each blade experiences a small rotation about the ring laser gyroscope axis. The voltage is oscillatory so that the blades are constantly vibrating in phase, and the ring laser gyroscope frame mounted to the blades rotates about the axis.

The amplitude of the dithering is generally carefully controlled and monitored to minimize the effects of lock-in. Since the dither oscillation angular velocity and displacement relative to a support structure can be constantly monitored, they may be excluded from the output signal of the ring laser gyroscope. It has been found that a constant dithering amplitude is inadequate to eliminate all of the effects of lock-in.

Body dither must be accomplished so that the ring laser gyroscope frame rotates only about the sensing axis. Any small component of rotation about other axes causes the sensing axis to precess in a cone-shaped path about the direction in should point. This motion of the axis is called coning. Any change in the direction of the axis due to dithering introduces errors into the output of the ring laser gyroscope.

To reduce coning, the plane of oscillation of the flexure is aligned perpendicular to the sensing axis, and the axis of the dither is collinear with the sensing axis to very close tolerances. To further minimize oscillations about other axes, the dither flexure should be as rigid as possible to resist any tendency to oscillate about other axes. Since all mechanical systems have natural frequencies of oscillation, there will in general be some small amount of oscillation about other axes. Typical dither flexures have rotational and translational resonant frequencies below 1000 Hz and have relatively high compliances, which, when combined with relatively low coning frequencies, lead to large system bias errors. These compliant flexures allow a relatively large amplitude frame input axis motion, which couples with system block motion to cause angle errors that cannot be software compensated.

One approach to reducing lock-in error is to superimpose a random signal upon the amplitude of the dither driving amplifier. However, the superposition of a random signal on the dither driver produces other substantial errors.

Ring laser gyroscopes may be mounted upon a gimballed system. Typically in a gimballed mounting system the sensing axes of the ring laser gyroscopes are held fixed relative to an inertial reference or relative to coordinates fixed upon the earth.

Another method for mounting ring laser gyroscopes is to attach them to a vehicle so that the sensor axes are aligned with a set of orthogonal axes on the vehicle. Accelerometers are also attached to the vehicle, and a computer transforms data from the accelerometers and the rotation sensors into navigation coordinates. This configuration is called a strapped down mechanization. Because of its scale factor accuracy and dynamic range, the ring laser gyroscope is more suitable for a strapped down system than a spinning rotor gyroscope. The scale factor accuracy of a ring laser gyroscope is typically five to ten times that of a spinning rotor gyroscope.

A strapped down mechanization may have shock absorber devices mounted between the vehicle and the instruments. When more than one ring laser gyroscope is strapped down, it is customary to support all of the ring laser gyroscopes upon a platform or mounting structure supported by low-pass shock mounted connected between the ring laser gyroscopes and the vehicle.

It the natural frequencies of the ring laser gyroscopes are the same, oscillation of one ring laser gyroscope may excite oscillation in another ring laser gyroscope. The mechanical interaction between the ring laser gyroscopes produces complex angular motions that are functions of the sums and differences of the dither frequencies of each of the ring laser gyroscopes. Coning results when two or more of the natural frequencies are near one another. Therefore, in order to minimize coning, the ring laser gyroscopes have different natural mechanical frequencies. These natural frequencies typically differ by five to ten hertz. A three decibel bandwidth of a ring laser gyroscope is about fiver hertz.

In a mechanically dithered system, coning motion of the support structure arises because of reaction torque through the support or platform from one ring laser gyroscope to another. The input coning motion produces a coning signal in the outputs of the angular rotation sensors. Unacceptable coning errors may result even when the natural frequencies differ by several bandwidths.

In a Faraday cell dithered system, coning motion of the support platform arises because of magnetic coupling between the Faraday cells in the separate ring lasers.

U.S. Pat. No. 4,115,004 to Hutchings et al., assignee to Litton Systems, Inc., assignor of the present invention, discloses a dual spring system that mounts a counterweight to the ring laser gyroscope case to reduce oscillatory motion of the case due to oscillation of the gyroscope. This dual spring system includes a first set of springs mounted between the case and the gyroscope and a second set of springs mounted between the case and the counterweight.

U.S. Pat. No. 4,309,107 to McNair et al., assignor to Litton Systems, Inc., assignee of the present invention, discloses a ring laser gyroscope dither mechanism for isolating vibrational energy generated by dithering the gyroscope and prevents that energy from passing to the mounting case of the gyroscope. McNair et al. discloses a three spring system for mounting a gyroscope to a housing or case, mounting a counterweight to the gyroscope and mounting the counterweight to the case. This arrangement reduces the amount of angular vibrational energy that passes to the case of the gyroscope by using the counterweight to provide a reaction to the oscillations within the gyroscope caused by mechanically dithering to prevent lock-in.

U.S. Pat. No. 3,464,657 to Bullard discloses a single set of springs connected between the frame and mounting platform of an aircraft instrument to isolate vibrational energy from the instrument.

U.S. Pat. No. 3,373,650 to Killpatrick discloses a dithering system in which a varying bias in the frequency is applied to at least one of the counterpropagating beams. Killpatrick discloses a Faraday cell and two quarter wave plates in the path of the counterpropagating light beams. The Faraday cell includes a coil that is energized by an oscillatory current to produce an oscillatory magnetic field that interacts with the counterpropagating beams. The varying bias causes a varying frequency difference between the counterpropagating beams. This frequency difference is generally greater than the frequency difference that occurs at the lock-in threshold. The polarity of the frequency difference is periodically alternated so that the time integral of the frequency difference over the time interval between sign reversals is substantially zero.

U.S. Pat. No. 3,467,472 discloses a dithering system similar to that disclosed by Killpatrick in U.S. Pat. No. 3,373,650. However, U.S. Pat. No. 3,467,472 discloses randomly changing the amount of bias in order to reduce the random walk resulting from lock-in when the sign change of the bias reverses.

U.S. Pat. No. 4,248,534 discloses a mechanism that sinusiodally dithers a ring laser gyroscope. The output of the ring laser gyroscope is corrected for error caused by lock-in at the extremes of the oscillations. The outputs of a photodiode that measures the light intensity of the interference pattern at each zero dither velocity are accumulated. When the accumulated phase error becomes $2\pi$, an overflow pulse is generated and added to the output of the ring laser gyroscope to correct for accumulated errors caused by lock-in at the zero dither velocity.

U.S. Pat. No. 4,526,469 to Egli et al. discloses a discriminant apparatus for ring laser gyroscopes. The discriminant is related to the weighted vector sum of the coupling of energy between the counterpropagating waves and can be used to indicate the magnitude of the lock-in rate. The discriminant is used in a closed loop ring laser gyroscope to alter the path traveled by the counterpropagating waves to adjust the weighted vector sum of the energy coupled therebetween so that the effects of lock-in are reduced.

U.S. Pat. No. 4,529,311 to Morgan et al. discloses the use of an incremental error parameter related to the instantaneous phase difference between the two counterpropagating beams in a ring laser angular rate sensor to generate a set of error parameters that correspond to the contribution of lock-in error in the output of the sensor. The error parameters can be used in a control loop for indirectly reducing the error in the sensor output or the error parameters can be used for a combination of error reduction and compensation.

It is generally desirable to dither a ring laser gyroscope at the resonant frequency of the mechanical system. The resonant frequency is the natural frequency of oscillation of a system. Less energy input is requried to maintain oscillations at the resonant frequency that at any other frequency. Oscillations normally are maintained by piezoelectric actuators attached to the springs that connect the hub of a dither flexure to the rim, which is mounted to the ring laser gyroscope frame. The piezoelectric actuators are low power devices that are driven by alternating an alternating voltage that has a frequency equal to the resonant frequency of the mechanical system. However, the resonant frequency of the mechanical system changes as the temperature changes. Therefore, it is necessary to monitor the resonant frequency of the flexure system and vary the electrical frequency of the drive voltage applied to the piezoelectric actuators as the resonant frequency changes.

U.S. Pat. application Ser. No. 448,363 filed Dec. 9, 1982, now U.S. Pat. No. 4,597,667, and assigned to Litton Systems, Inc., assignee of the present invention, discloses a dither controller for a ring laser gyroscope angular rotation sensing system in which a sensor produces a signal indicative of the dither angular motion. That application issued July, 1, 1986 as U.S. Pat. 4,597,667. The drive circuit for dithering the ring laser gyroscope body is sampled at time intervals that are shorter than the period of the natural oscillation of the ring laser gyroscope body. The absolute values of the samples are averaged to obtain a measure proportional to the average of the peak amplitude of the dither oscillation signal. When the peak amplitude decays to a predetermined minimum value, a driving torque is applied to the ring laser gyroscope. When the sum of the samples increases to sufficiently, the ring laser gyroscope is allowed to oscillate at its natural frequency while the amplitude slowly decays to the minimum value at which the driving torque is applied again.

In the above identified patent application the phase characteristic near resonance is used in a feedback loop to track the changes of the resonant frequency. The tracking is implemented by a hardware counter that counts the time interval between the transitions of the digital counter based oscillator used to switch the current of the drive and a hardware developed squared angular velocity signal. A complication is that the constant current driver contributes a fixed component based delay that must be compensated for in software. A second complication is that the phase value developed is only valid if the dither amplitude is large enough to make the crossovers meangingful. At turn-on an approximate resonant frequency is established by sweeping the gyro frequencies over the build range with maximum drive and recording when the amplitude sums exceed a fixed value. The turn-on frequency is determined by estimating the peak amplitude point. After turn-on, once the gyro is up and dithering, the phase feedback loop is engaged.

In a Faraday cell dithering system the driving voltage is pulsed on and off. The current in the Faraday coil is sensed so that the bias is turned on when the current decreases below a predetermined minimum value. The bias is turned off when the current rises sufficiently so that the current then begins to decay to the minimum value. Thus the dither drive current and Faraday cell magnetic field have oscillatory amplitude, and the lock-in band of the ring laser gyroscope is reduced.

SUMMARY OF THE INVENTION

The present invention provides significant advantages over prior dither drive systems. The invention comprises a dither drive control for a ring laser angular rotation sensor that includes a dither flexure mounted between a ring laser gyroscope body and a support such that the ring laser gyroscope may be dithered to have angular oscillations about a sensing axis. A dither drive supplies energy to the dither flexure to oscillate said ring laser gyroscope body about the sensing axis, and a sensor senses the amplitude of the oscillations of the ring laser gyroscope body relative to the support. The frequency of the dither oscillations is modulated about a tracking frequency, and the effect of frequency changes in the dither drive signal on the amplitude of the oscillations is demodulated to determine the resonant frequency of the dither flexure.

A dither drive control according to the present invention comprises dither drive means for supplying energy to the dither flexure to oscillate said ring laser gyroscope body about the sensing axis; means for sensing the amplitude of the oscillations of the ring laser gyroscope body relative to said support; means for modulating the frequency of the dither oscillations; and means for determining the resonant frequency of the dither flexure from the effect of frequency changes in the dither drive signal on the amplitude of the dither oscillations.

The dither drive control according to the present invention may further comprise means responsive to said demodulating means for driving the dither flexure at the resonant frequency. The dither drive control according to the present invention may further comprise means for activating said dither drive means to maintain the dither oscillations of said dither flexure to have a predetermined amplitude range.

The dither drive control according to the present invention may also further comprise a dither drive amplifier for providing dither drive signal to said dither flexure; a frequency modulator connected to said dither drive amplifier for modulating the frequency of the dither drive signal; an amplifier connected to said sensing means to receive a position signal therefrom; and means for determining the number of tims in a predetermined time interval that the dither drive amplifier is actuated at each of a plurality of frequencies of the dither drive signal.

The method according to the present invention for controlling a dither drive for a ring laser angular rotation sensor comprises the steps of supplying energy to the dither flexure with dither drive means to oscillate said ring laser gyroscope body about the sensing axis; sensing the amplitude of the oscillations of the ring laser gyroscope body relative to said support; modulating the frequency of the dither oscillations; and determining the resonant frequency of the dither flexure from the effect of frequency changes in the dither drive signal on the amplitude of the dither oscillations.

The method according to the present invention may further comprise the step of driving the dither flexure at the resonsant frequency. The method according to the present invention may also further comprise the step of activating said dither drive means to maintain the dither oscillations of said dither flexure to have a predetermined amplitude range.

The method according to the present invention may also further comprise the steps of providing dither drive signal to said dither flexure from a dither drive amplifier; modulating the frequency of the dither drive signal with a frequency modulator connected to said dither drive amplifier; connecting an amplifier to said sensing means to receive a position signal therefrom; and determining the number of times in a predetermined time interval that the ditehr drive amplifier is actuated at each of a plurality of frequencies of the dither drive signal.

BRIEF DESCRIPTION OF THE DRAWINGS

FIG. 8 graphically represents dither frequency and dither drive duty cycle as functions of command phase counts;

DESCRIPTION OF THE PREFERRED EMBODIMENT

Figure 1:
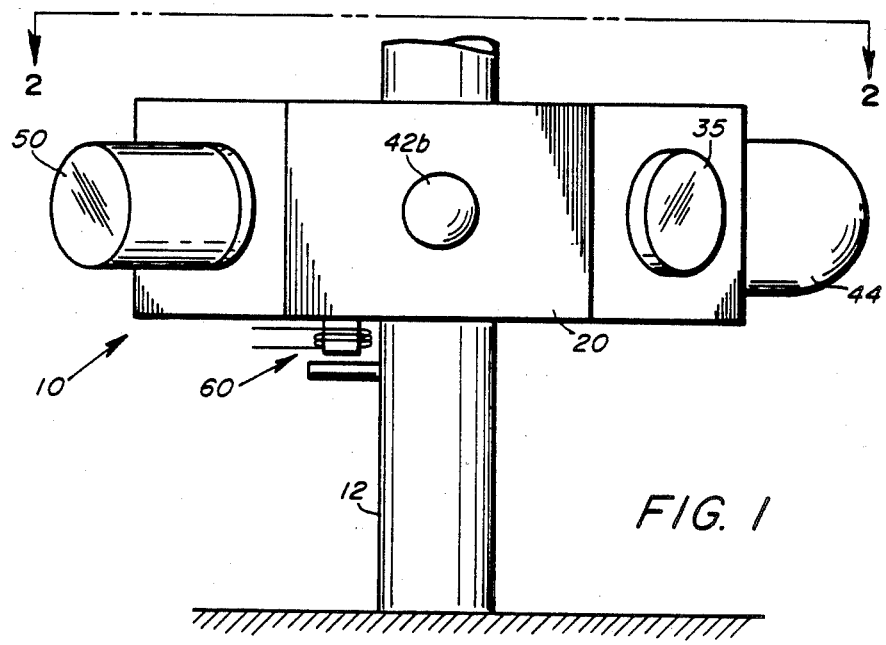
FIG. 1 is a perspective view of a ring laser gyroscope mounted upon a supporting structure.
Figure 2:
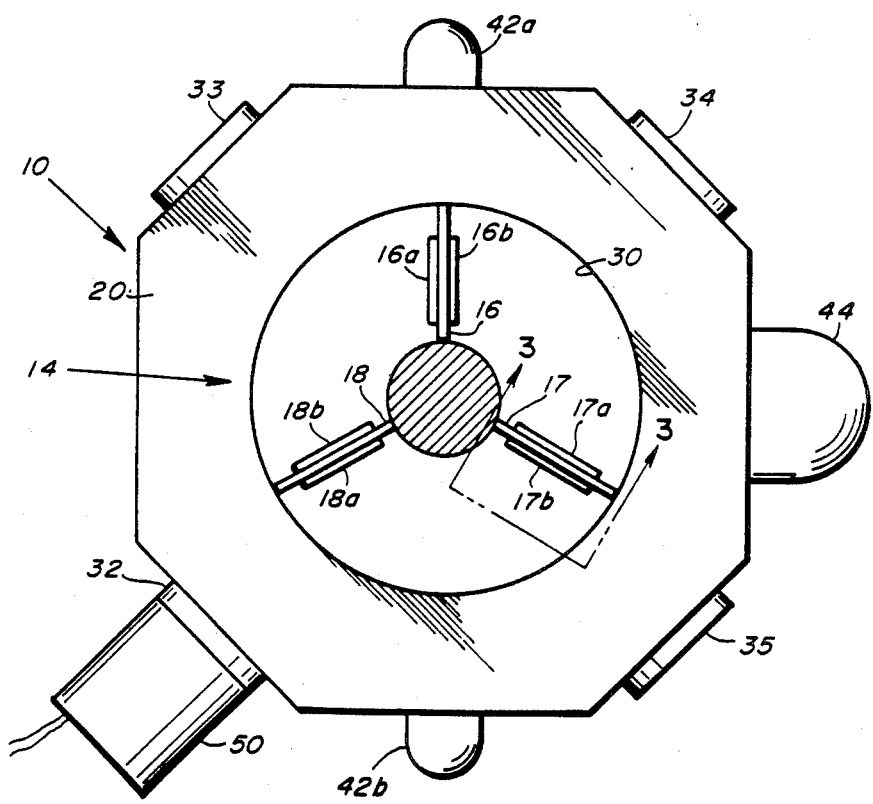
FIG. 2 is a plan view of the ring laser gyroscope of FIG. 1.

Referring to FIGS. 1 and 2, a ring laser gyroscope 10 is mounted on a support 12. The ring laser gyroscope 10 is exemplary of many such devices with which the present invention may be practiced and does not limit the present invention to the particular embodiment of the ring laser gyroscope 10 shown in FIGS. 1 and 2 and described herein.

Figure 3:
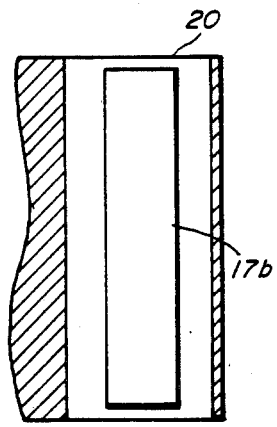
FIG. 3 is a partial cross sectional view along line 3—3 of FIG. 1 showing a piezoelectric driver mounted to a dither spring.

The ring laser gyroscope 10 is supported by a flexure mechanism 14 that comprises a plurality of springs 16–18 connected between a frame 20 and the support 12. The illustrated embodiment includes three springs, but the invention may be practiced with any number of springs. Referring to FIGS. 2 and 3, the springs 16–18 may be formed as thin rectangles, but the present invention is not limited in its applicability to springs having such configurations.

Referring to FIGS. 2 and 3, a pair of piezoelectric wafers 16A, 16B, 17A, 17B, 18A and 18B are mounted on the springs 16–18, respectively. All of the spring and wafer combinations are essentially the same; therefore, only spring 16 and piezoelectric wafers 16A and 16B are described in detail herein. The piezoelectric wafers 16A and 16B have generally rectangular configurations and are mounted on opposite side of the spring 16. The piezoelectric wafers 16A and 16B preferably are mounted to the spring 16 by a suitable bonding agent.

The piezoelectric wafer 16A is poled such that application of a driving voltage to a pair of electrodes 22 and 24 on opposite sides thereof causes the piezoelectric wafer 16A to selectively expand or contract. The piezoelectric wafer 16B is also polled and has a pair of opposing electrodes 26 and 28 connected thereto. The piezoelectric wafers 16A and 16B may have opposite polarities so that application of the same driving signal thereto causes one wafer, for example wafer 16A, to expand while the other wafer 16B contracts. If the wafers 16A and 16B have the same polarities, then the driving voltages must have opposite polarities in order to achieve the desired effect of alternately expanding and contracting. The piezoelectric wafers 17A, 17B, 18A and 18B have polarities and driving voltages substantially identical to the piezoelectric wafers 16A and 16B, respectively. Therefore if the piezoelectric wafers 16A, 17A and 18A contract while the piezoelectric wafer 16B, 17B and 18B expand, the springs 16, 17 and 18 will deform so that the frame 20 rotates clockwise about the support 12. A change in sign of the driving voltage causes a counterclockwise rotation of the frame 20 about the support 12.

Referring to FIG. 2, a cavity 30 formed in the frame 20 extends between a plurality of mirrors 32–35, which guide light around a closed path 36 inside the cavity 30. A gain medium 38, which is typically comprises a mixture of helium and neon gases, is confined to a region 40 of the cavity 30 between a pair of anodes 42A and 42B. Application of an excitation voltage to the anodes 42A and 42B and a cathode 44 causes energy level transitions in the gas mixture, as is well-known, to produce counterpropagating coherent light beams in the cavity 30.

One of the mirrors, for example the mirror 32 is partly transmissive so that a portion of each beam enters a prism 48 mounted to the back of the mirror 32. The prism 48 is formed to combine the counterpropagating beams so that they interfere with one another before impinging upon a photodetector 50.

The two counterpropagating beams undergo phase shifts in circulating around the cavity 30 by successive reflection from the mirrors 32-35 as the cavity 30 rotates about its longitudinal axis. The difference in the phase of the two counterpropagating beams is indicative of the rotation rate of the ring laser gyroscope 10 about its longitudinal. Since the cavity 30 acts as a resonant cavity to the two beams, the frequency of each beam is sharply defined so that the phase shifts are detectable.

Figure 4:
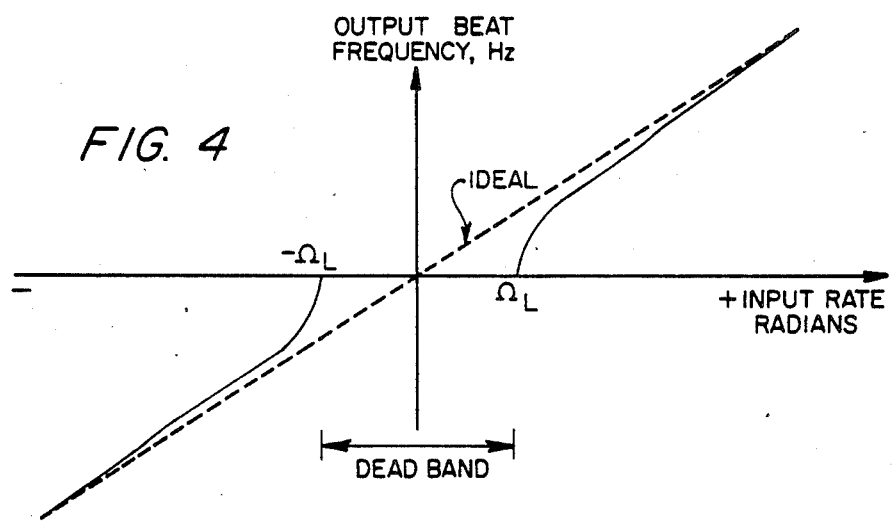
FIG. 4 graphically illustrates the output beat frequency of a ring laser gyroscope as of a rotation rate.

The two frequencies heterodyne or mix and form a beat signal whose frequency is directly proportional to the rotation of the ring laser gyroscope 10 about its longitudinal axis. Referring to FIG. 4, when the rotation rate of a simple, unbiased ring laser gyroscope 10 is reduced to the lock-in threshold rate $\Omega_L$, the counterpropagating beams lock at the same frequency. The frequencies of the counterpropagating beams are the same for a range of rotation rates $\pm \Omega_L$, which is the lock-in deadband shown in FIG. 4. Referring to FIG. 4, the signal output from the ring laser gyroscope 10 becomes non-linear in the vicinity of the deadband, which is a departure from the output of an ideal ring laser gyroscope.

Figure 5:
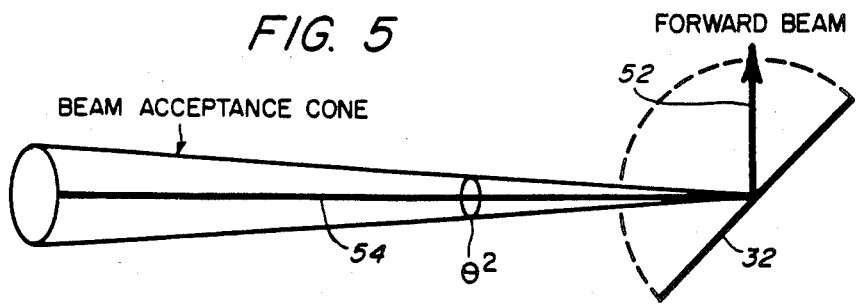
FIG. 5 illustrates forward reflected and backscattered light from a mirror of the type that may be included in the ring laser gyroscope of FIG. 1.

Referring to FIG. 5, lock-in is believed to be caused primarily by radiation backscattered from the mirrors 32-35. Since the counterpropagating beams strike each of the mirrors 32-35 at an angle of incidence of 45°, there would be no backscattered radiation from ideal, perfectly flat mirrors. The main portion 52 of each beam is forward reflected from the mirror 32, for example, according to the laws of reflection. However, even though the mirrors 32-35 are of very high quality, surface imperfections cause some specular reflection of each beam in all directions. A portion 54 of light from one beam that is backscattered into an acceptance solid angle for the oppositely directed beam couples thereto. The acceptance solid angle depends upon the wavelength of the light and the diameter of the cavity 30. For a typical square ring laser gyroscope 10 having a 45° angle of incidence, about one part in $10^6$ of the total specular reflection from any one of the mirrors 32-35 is scattered into the acceptance angle of the counterpropagating beam.

Figure 6A:
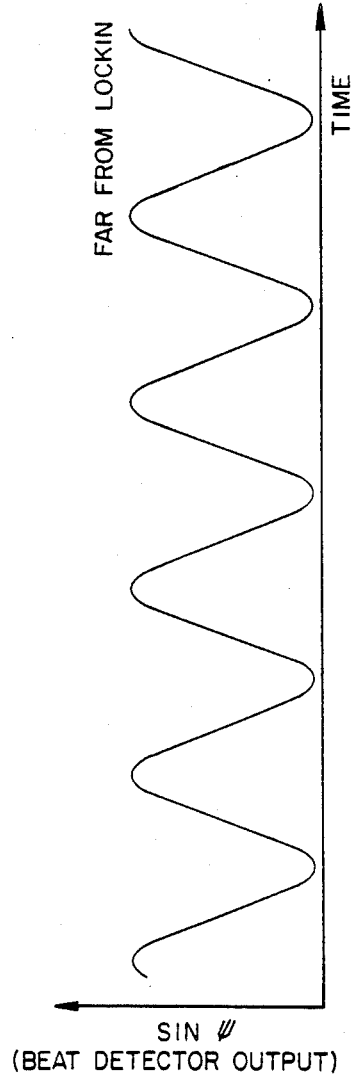
FIGS. 6A and 6B illustrate the output waveform of the ring laser gyroscope of FIG. 1 for rotation rates far from the lock-in threshold and near the lock-in threshold, respectively.
Figure 6B:
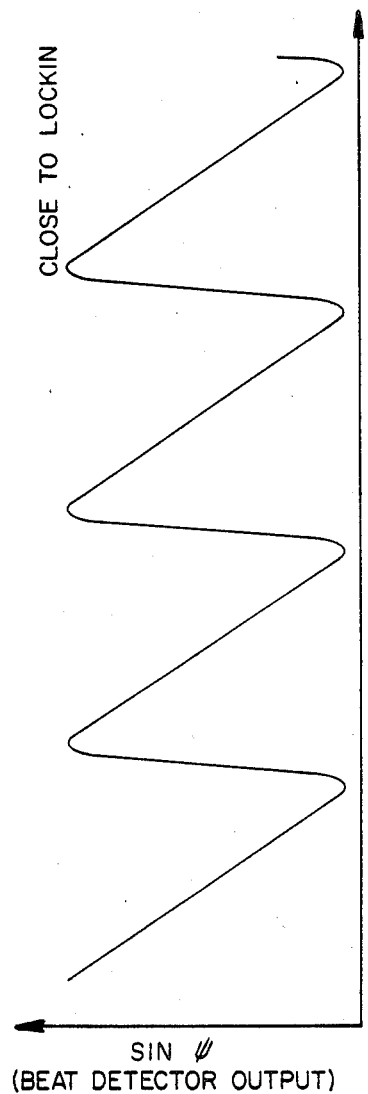

Referring to FIG. 6A, the output of the detector 50 as a function of time is sinusoidal when the rotation rate is far from the lock-in threshold. Referring to FIG. 6B, when the rotation rate is near the lock-in threshold, the output of the detector 50 is distorted from the desired sinusoidal waveform. For a typical ring laser gyroscope having a cavity length of 49 cm, the lock-in threshold is about 100°/hr. Therefore, obtaining satisfactory results from the ring laser gyroscope 10 requires avoidance not only of lock-in but also avoidance of the rotation rates near the deadband.

The flexure mechanism 14 is designed to have a high mechanical Q of approximately 100. The Q, or quality factor, of a system is the ratio of the energy stored to the energy dissipated per cycle. A high Q means that very little of the input energy is dissipated as heat, for example, so that the low power piezoelectric wafers 16A, 16B, 17A, 17B, 18A and 18B can dither the ring laser gyroscope 10 at the desired amplitude. Typically the dither vibration is sinusoidal. A power amplifier delivers sinusoidal electrical signals to the low power piezoelectric wafers 16A, 16B, 17A, 17B, 18A and 18B.

Referring to FIG. 1, a sensor 60 determines the instantaneous position of the frame 20 with respect to the support 12. In a preferred embodiment of the present invention, the sensor 60 comprises a magnetic pickoff sensor. The sensor 60 provides signals indicative of the amplitude of the dither oscillations. These amplitude signals are processed by the circuitry of FIG. 7 to track the resonant frequency of the dither vibrations.

Figure 7:
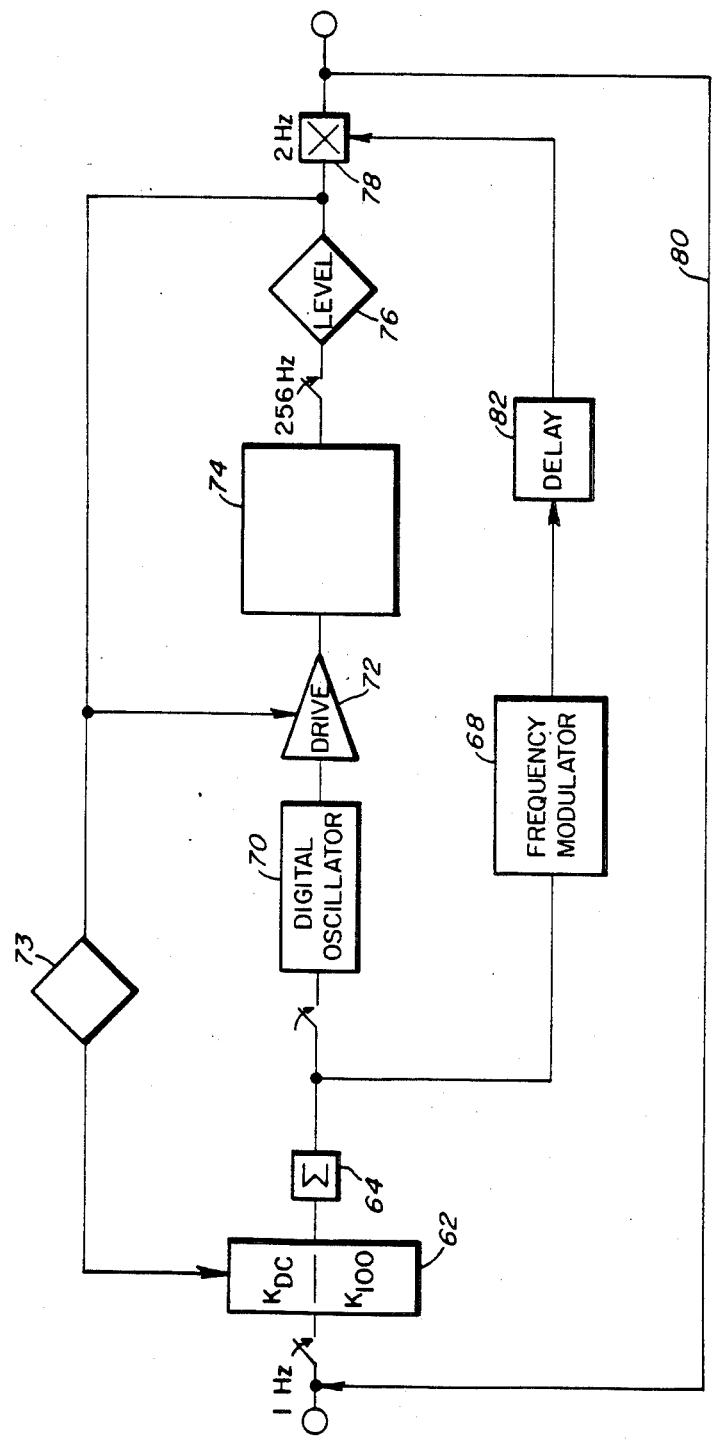
FIG. 7 is a block diagram of a frequency tracking circuit according to the present invention.

Referring to FIG. 7, the sensor 60 is a component of the laser gyroscope and associated electronics 74, which provides an output to a sampling and level indicator circuit 76. An error signal 80 is derived from the sampling and level indicator circuit 76, and this error signal 80 is fed back to frequency tracking circuit 64. An electronic switch 66 receives inputs from the tracking circuit 64 and from a frequency modulator 68. The electronic switch 66 provides an output to a digital oscillator 70 that outputs a tracking signal having a frequency f to the dither drive amplifier 72. The electronic switch 66 and the frequency modulator 68 cooperate to vary the driver signal by ±0.4 Hz around the tracking frequency, f, at a rate of 2 Hz. Therefore, the output of the digital oscillator alternates between (f-0.4) Hz and (f+0.4) Hz every 0.5 seconds.

The output of the dither drive amplifier 72 is input to the laser gyroscope and the angular position indicator circuit 74, which provides an output signal sampled at a frequency of 256 Hz to a level indicator circuit 76. The output of the level indicator circuit 76 is input to a differencing circuit 78 which produces an error signal by maintaining separate sums of how many times the driver was turned on at each frequency. The error signal 80 produced by finding the difference of the two sums provides a demodulated feedback signal that is fed back to the amplifier 62 via a first order digital tracking loop.

A delay 82 is connected between the frequency modulator 68 and the differencing circuit 78 to reduce the noise on the feedback signals due to the finite response time of the springs 16-18.

Direct logic continuously searching for a peak amplitude is not possible because the amplitude control loop is turning the drive on/off at f256 Hz to maintain a commanded amplitude. However, the sequence of on and off decisions contain direct information on the resonant frequency. As the the drive frequency approaches the resonant frequency of the springs 16-18, the average duty cycle of hte dither drive amplifier 72 decreases because the energy required to maintain oscillation at a given amplitude decreases as the frequency approaches the resonant frequency. Thus, modulating the frequency of the dither drive amplifier 72 in a known manner and counting the number of times the driver is turned on at a given output frequency, generates an error signal by differencing the counts. Therefore, taking the difference of the counts, in effect, demodulates the amplitude information.

Referring to FIG. 8 there is shown ring laser gyroscope data supporting the statement above that the driver duty cycle is inverse to the amplitude transfer function. FIG. 8 shows the closed loop dither frequency and a percentage duty cycle as variables versus the commanded phase count. The data for FIG. 8 was taken in a special series of tests to establish the scaling for the frequency offset logic. The duty cycle variable was generated by digitally filtering the on/off commands with a simple one second time constant filter.

Referring again to FIG. 7, two alternate integration gains $K_{100}$ and $K_{DC}$ are shown to indicate that two alternate feedback signals are being computed to solve another problem. A gain control circuit 73 controls the gain as a function of the duty cycle of the dither drive amplifier 72. It is clear that when the duty cycle rises to 100%, there will be no difference counts generated; and the drive 72 will be on for 128 counts for each frequency. In this case the amplitude sums themselves are used directly, and the gain indicated as $K_{100}$ in FIG. 7 is used. Again separate sums are maintained for the half second intervals, and the difference is generated as a feedback signal. When the total on count for a one second update interval is 256, the alternate error and gain may be used to update the track period as maintained by the sum variable. If the duty cycle is below 100%, the gain indicated as $K_{DC}$ is used.

The method based on amplitude sums may also be used as the sole means of tracking, i.e., when the duty cycle is less than 100% also. This is another embodiment of the method of the invention Note that the timing given the basic quantization step of the duty cycle error variable is parts per 128 in the described embodiment. Other timing quantizations steps may be used without departing from the scope of the present invention. Further, the error developed is non-linear because as the system is further off resonance, the overall duty cycle increases and the difference count decreases.

A second order underdamped system parameterized by a mechanical Q of 100 and a natural resonance frequency of 400 Hz is the basic model discussed herein by way of example. The results presented herein are based on specific exemplary gains, switching rates, and delays that give the best overall results.

Two options for the frequency modulating function are described herein. The simple switching modulation (SSM) as described previously is one frequency modulation function that may be used. The other frequency modulation function is a secondary dither frequency (SDF) modulation that has proved successful in unlocking ring laser gyroscopes. For this application a shift register generated pseudo random frequency offset was slowed down to 2 Hz updates with a range of ±0.4 Hz. Referring again to FIG. 7, a 16 Hz delay was used for both options.

Figure 9:
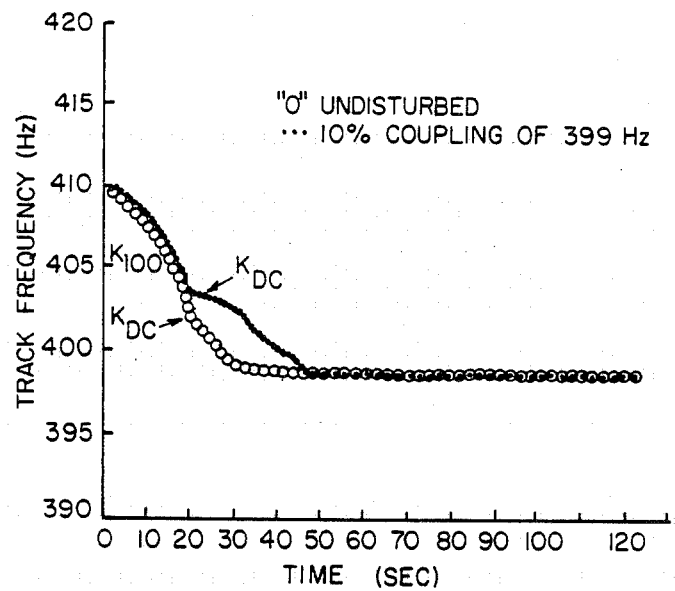
FIG. 9 graphically represents acquisition of tracked frequency as a function of time for switch modulation.
Figure 10:
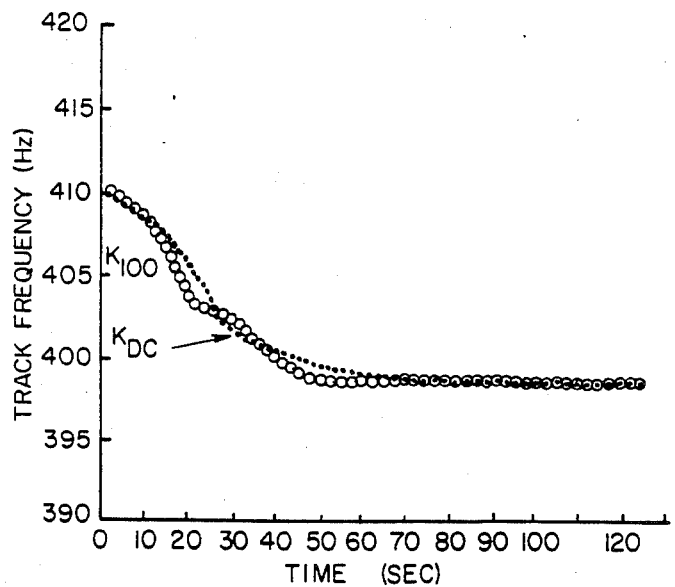
FIG. 10 graphically represents acquisition of tracked frequency as a function of time for secondary dither frequency modulation.

FIG. 9 shows the results for a step response characteristic of the SSM modulation, and FIG. 10 shows the results for SDF modulation. Two curves are shown on each plot. One curve represents the undisturbed case, and the other represents the effect of coupling in a 399 Hz constant frequency signal with an amplitude equivalent to 10% of the maximum drive amplitude of the dither drive amplifier 72. This coupling level represents the effect of other ring laser gyroscopes (not shown) that are typically included in complete guidance systems.

The driver is parameterized by a unitless amplitude constant such that a value of 1.0 for this constant results in a final capture duty cycle of 50% for the nominal Q of 100. Since the initial starting point of the step response of 410 Hz is several bandwidths away from the resonant frequency, which was determined by the final track value to be about 398.6, the drive is full on for the first few seconds of the step response plots and the alternate gain $K_{100}$ is used. The graphs show the point where the duty cycle drops below 100%, and the error signal is developed from the duty cycle count difference with the gain $K_{DC}$.

Note that the coupled-in frequency is less than 0.5 Hz away from the final track frequency. Although the coupling does disturb the tracking, in both cases the tracking loop correctly tracks through the disturbing frequency to find the track frequency.

Therefore, the dither control system of the present invention controls the dither drive amplifier by modulating the frequency of dither and demodulating the frequency effect on the amplitude of the drive as determined by counting the duty cycle of the on/off controller. In effect the amplitude characteristic of the high Q dither spring is used to track the resonant frequency, whereas previous systems use phase characteristics determined by timing the interval between zero crossovers of the dither drive signal and the pickoff signal. Thus, the present invention processes the sampled amplitude to determine both whether the dither drive amplifier should be activated and what should be the frequency of the dither drive signal.

The pickoff signal from the sensor 60 is preferably sampled at a rate of 2048 Hz. Control of the dither amplitude is based on rectifying the digital pickoff signal, summing down to 256 Hz, and turning the dither drive on and off based upon whether the amplitude sum is above or below a predetermined level. Because of the limitations of the driver, it is necessary that the driving frequency be within a few Hertz of the resonant frequency of the dither flexure 14 about the sensor axis, nominally 400 Hz, in order to achieve the desired dither amplitude.

Although the present invention has been described with reference to a specific preferred embodiment, modifications may be made to this preferred embodiment without departing from the scope of the invention as defined by the claims appended hereto. In particular, the preferred embodiment is a digital mechanization of the invention, but analog circuitry will perform the same functions as the digital circuitry described herein.

What is claimed is:

1. A dither drive control for a ring laser angular rotation sensor that includes a dither flexure mounted between a ring laser gyroscope body and a support such that the ring laser gyroscope may be dithered to have angular oscillations about a sensing axis, comprising:

dither drive means for supplying a dither drive signal having a variable amplitude and frequency to the dither flexure to oscillate said ring laser gyroscope body at a selected amplitude about the sensing axis;

means for modulating the frequency of the dither drive signal to modulate the frequency of the dither oscillations, the amplitude of the dither drive signal required to maintain the selected amplitude of the dither oscillations being a function of the frequency of the dither oscillations;

means for demodulating the effect of modulating the frequency of the dither oscillations on the amplitude of the dither drive signal required to maintain the selected amplitude of the dither oscillations; and means responsive to the demodulating means for controlling the dither drive means to drive the dither flexure at the selected amplitude and at a selected frequency.

2. The dither drive control of claim 1, wherein the means responsive to the demodulating means further comprises means responsive to said demodulating means for driving the dither flexure at its resonant frequency by selecting the dither drive signal frequency be the frequency at which a minimum dither drive energy is required to maintain the constant amplitude of the dither oscillations.

3. The dither drive control of claim 1, further comprising:
a dither drive amplifier for providing the dither drive signal to said dither flexure;
a frequency modulator connected to said dither drive amplifier for modulating the frequency of the dither drive signal;
means for sensing the amplitude of the dither oscillations relative to said support; and
means for determining the number of times in a predetermined time interval that the dither drive amplifier is actuated at each of a plurality of frequencies of the dither drive signal.

4. A dither drive control for a ring laser angular rotation sensor that includes a dither flexure having an outer ring mounted to a ring laser gyroscope body and a central hub mounted to a support such that the ring laser gyroscope may be dithered to have angular oscillations about a sensing axis, comprising:
dither drive means for supplying energy to said dither flexure to oscillate said ring laser gyroscope body about the sensing axis;
means for sensing the amplitude of the oscillations of said ring laser gyroscope body relative to said support;
means for activating said dither drive means whenever the amplitude of the dither oscillations falls below a predetermined value;
an amplifier connected to said sensing means for receiving a dither amplitude signal;
means for modulating the dither drive frequency around a tracking frequency;
means for determining the number of times the dither drive is activated as a function of frequency;
means for determining the angular position of said dither flexure;
means for determining the magnitude of the dither drive signal; and
feedback means connected between said magnitude determining means and said amplifier for controlling the gain of said amplifier.

5. A method for controlling a dither drive for a ring laser angular rotation sensor that includes a dither flexure mounted between a ring laser gyroscope body and a support such that the ring laser gyroscope may be dithered to have angular oscillations about a sensing axis, comprising the steps of:
supplying a dither drive signal having a variable amplitude and frequency to the dither flexure with dither drive means to oscillate said ring laser gyroscope body at a selected amplitude about the sensing axis;
modulating the frequency of the dither drive signal to modulate the frequency of the dither oscillations, the amplitude of the dither drive signal required to maintain the selected amplitude of the dither oscillations being a function of the frequency of the dither oscillations;
demodulating the effect of modulating the frequency of the dither oscillations on the amplitude of the dither drive signal required to maintain the selected amplitude of the dither oscillations; and
controlling the dither drive means means to drive the dither flexure at the selected amplitude and at a selected frequency.

6. The method of claim 5, further comprising the steps of selecting the frequency of the dither drive signal such that a minimum dither drive energy is required to maintain the constant amplitude of the dither oscillations, thereby driving the dither flecure at its resonant frequency.

7. The method of claim 5, further comprising the steps of
providing dither drive signal to said dither flexure from a dither drive amplifier;
modulating the frequency of the dither drive signal with a frequency modulator connected to said dither drive amplifier;
sensing the amplitude of the dither oscillations relative to said support; and
determining the number of times in a predetermined time interval that the dither drive amplifier is actuated at each of a plurality of frequencies of the dither drive signal.

8. A method for controlling a dither drive of a ring laser angular rotation sensor that includes a dither flexure having an outer ring mounted to a ring laser gyroscope body and a central hub mounted to a support such that the ring laser gyroscope may be dithered to have angular oscillations about a sensing axis, comprising:
supplying energy to said dither flexure to oscillate said ring laser gyroscope body about the sensing axis;
sensing the amplitude of the oscillations of said ring laser gyroscope body relative to said support;
activating said dither drive means whenever the amplitudes of the dither oscillations falls below a predetermined value;
connecting an amplifier to said sensing means for receiving a dither amplitude signal;
modulating the dither drive frequency around a tracking frequency;
determining the number of times the dither drive is activated as a function of frequency;
determining the angular position of said dither flexure;
determining the magnitude of the dither drive signal; and
connecting feedback means between said magnitude determining means and said amplifier for controlling the gain of said amplifier.

* * * * *